United States Patent
Pinchen et al.

(10) Patent No.: US 6,228,458 B1
(45) Date of Patent: *May 8, 2001

(54) PACKAGE WITH TEAR TAPE AND METHOD OF FORMING SAME

(75) Inventors: Stephen Paul Pinchen, Etwall; Saul James Butterworth, Grantham; Stephen Barry Maguire, Stanton-by-Bridge, all of (GB)

(73) Assignee: P. P. Payne Limited, Nottingham (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/720,073

(22) Filed: Sep. 27, 1996

(30) Foreign Application Priority Data

Sep. 28, 1995 (GB) .................................................. 9520015
May 9, 1996 (GB) .................................................. 9609656

(51) Int. Cl.[7] ...................................................... B32B 3/14
(52) U.S. Cl. ..................... 428/77; 206/242; 206/245; 206/264; 206/273; 264/171.13; 428/42.2; 428/43; 428/352; 428/355; 428/192; 428/194; 428/910
(58) Field of Search ...................... 428/77, 42.2, 43, 428/910, 352, 355, 192, 194; 264/171.13; 206/264, 273, 242, 245

(56) References Cited

U.S. PATENT DOCUMENTS

| 4,337,284 | * | 6/1982 | Cooper | 428/40.1 |
| 4,410,575 | | 10/1983 | Obayashi et al. | 428/57 |
| 4,410,582 | | 10/1983 | Tsunashima et al. | 428/212 |
| 4,638,911 | | 1/1987 | Prohaska | 206/611 |
| 4,681,797 | | 7/1987 | Van Iseghem | 428/212 |
| 5,249,676 | * | 10/1993 | Ashcraft | 206/264 |
| 5,520,868 | * | 5/1996 | O'Connor | 264/171.13 |

FOREIGN PATENT DOCUMENTS

| 2 323 643 | 11/1974 | (DE) . |
| 3401218 | 1/1984 | (DE) . |
| 0 042 832 | 12/1981 | (EP) . |
| 0 121 371 | 3/1984 | (EP) . |
| 0 142 904 | 5/1985 | (EP) . |
| 0 263 383 | 9/1987 | (EP) . |
| 0 595 722 | 10/1993 | (EP) . |
| 2 558 802 A1 | 8/1985 | (FR) . |
| 94/10042 | 10/1993 | (WO) . |

* cited by examiner

Primary Examiner—Nasser Ahmad
(74) Attorney, Agent, or Firm—Seyfarth Shaw

(57) ABSTRACT

Hermetically sealed packages for food, cigarettes and the like are formed from packaging material (37) having a tear tape (33) attached thereto. The tear tape includes a surface formed of a material (7) which flows under the conditions needed to seal portions (8,9) of the packaging material together when closing the package so as to fill any gaps between the tape and the packaging material portions.

9 Claims, 5 Drawing Sheets

PACKAGE WITH TEAR TAPE AND METHOD OF FORMING SAME

CROSS-REFERENCES TO RELATED APPLICATIONS

This application is a convention application of United Kingdom Patent Application No. 9520015.0 filed Sep. 28, 1995 and United Kingdom Patent Application No. 9609656.5 filed May 9,1996. Priority is claimed under 35 U.S.C. 119.

FIELD OF THE INVENTION

This invention relates to tapes and is concerned with tear tapes for hermetically sealed packages and more particularly, but not exclusively, packages based on flow wrap or vacuum wrapping methods as used in, for example, the coffee, cold meat, pre-packed cheese, and cigarette industries.

BACKGROUND OF THE INVENTION

It is well known that tear tapes are effective in opening various types of consumer packaging, especially those formed from packaging material using non-hermetic wrapping techniques such as roll wrapping and standard envelope wrapping. However, traditional tear tapes based on uncoated films, wax coated films, single surface hot melt coated films or those that use pressure sensitive adhesive/release coatings are unsuitable for hermetically sealed packages since their presence significantly reduces the efficiency of the end seals thereby allowing ingress of air, moisture and/or bacteria which, in the case of packaging for food products such as cheese, will reduce shelf life.

For example, with tear tapes incorporating a pressure sensitive adhesive coating and a release coating an opposite surfaces of a film, the tear tape is adhered to the packaging material by means of the pressure sensitive adhesive and the packaging material is then suitably wrapped around the product to be packaged. In a flow wrapping process, the packaging material is overlapped to form a tube including a side seal, the product is inserted into the tube, the tube is then closed by forming the end seals with the tear tape sandwiched between the layers of packaging material joined to form the end seals. As a consequence of the presence of the release coating on the tear tape, the end seal efficiency is significantly reduced. Similarly, in the case of tear tapes based on a film coated on one surface only with a hot melt coating, the end seal efficiency is reduced where the packaging material and the non-coated film surface are in contact. In both cases, gaps are also formed at both edges of the tear tape due to the physical size of the tear tape sandwiched between layers of the packaging material at the end seals.

SUMMARY OF THE INVENTION

It is an object of the present invention to provide a tear tape which, in addition to facilitating the opening of a hermetically sealed package, will also maintain the seal integrity when integrated into the package.

According to one aspect of the present invention there is provided, in combination, packaging material suitable for forming a hermetically sealed package and a tear tape attached thereto, which tear tape includes (i) a surface capable of sealing to the packaging material under the conditions required for sealing together portions of the packaging material to form the end seals of the package and (ii) a surface bonded to the packaging material and formed of a component which flows under said conditions.

In a particularly preferred embodiment, the tear tape includes a substrate formed from an oriented base film of thermoplastic plastics material. One surface of the base film may carry a layer of plastics material capable of sealing to the packaging material under the conditions required for sealing together portions of the packaging material to form the end seals of the package (hereinafter referred to as the sealing layer). The plastics material has a lower softening or melting point than the melting point of the tear tape base film and the packaging material and it may be applied to the substrate by, for example, co-extrusion. The other surface of the tear tape base film may be coated with a layer of, for example, a hot melt adhesive which bonds the tear tape to the packaging material along the whole length of the package and which flows, under the conditions required to seal the packaging material together when forming the end seals of the package, to seal the tear tape at the end seals (hereinafter referred to as the bonding layer).

Preferably, the tear tape is produced in the form of traverse wound reels containing from for example 3000–120,000 meters of tape 1.5–15 mm wide. In use, the bonding layer, for example, the hot melt adhesive surface of the tear tape is applied to the inside surface of the packaging material by the application of heat or heat and pressure across the whole length of the packaging material including that portion of the material intended to form the hermetic seal at the end of the package. The packaging material is then folded and overlapped to form the side seal of the package, the product is inserted, and the end seals are formed to encapsulate the product and, as a result, the sealing layer is adhered to the packaging material portion forming the end seals of the package. The hermetic seal of the package is maintained by the action of the hot melt adhesive (the bonding layer) flowing around the tear tape edges when the end seal is formed by heat and pressure. Hot melt adhesive transfer from the film surface to the tape edges eliminates gaps in the seal which would otherwise enable the ingress of air, moisture or bacteria. The flowing action of the hot melt adhesive and the seal integrity are ensured by appropriately controlling the following factors: tear tape base film thickness, hot melt adhesive viscosity, hot melt adhesive coating weight, and the temperature and pressure of the sealing jaws needed to seal together the portions of the packaging material when forming the end seal of the package.

The nature of the packaging material is dependent on the nature of the product to be packaged but generally the packaging material will be based on polyethylene, polyethylene terephthalate or polyamide. Typical examples are, for cooked meats an LDPE/PVDC/LDPE multi-layer material or a PVDC coated PET (15 microns)/LDPE material; for peanuts a metallised PET (12.5 microns)/LDPE (50 microns) material; for bacon a cast polyamide (Nylon) (20 microns)/LDPE (50 microns) material; and, for cheese, a cast polyamide (50 microns)/LDPE (70 microns) material. LDPE is low density polyethylene, PVDC is polyvinylidene chloride, and PET is polyethylene terephthalate. All these packaging films are designed to provide gas and moisture barriers.

According to another aspect of the present invention there is provided a tear tape for use in the aforementioned combination, which tear tape comprises:
  (i) a film having a thickness of from 20 to 60 microns and a width of from 1 to 20mm and formed of oriented polypropylene or oriented polyester (polyethylene terephthalate),
  (ii) a sealing layer of thickness of from 5 to 40 microns provided on one surface of the film to enable the tear tape to be sealed to polyethylene-, polyethylene terephthalate-, or polyamide-based filmic packaging material, said sealing layer having a softening or melting point which is less than the melting point of the film and being formed from polyethylene, ethylene/vinyl acetate copolymer, polyvinylidene chloride, polyamide or wax, and (iii) a bonding layer provided on the opposite surface of the film at a coating weight of from 5 to 50 gram per square meter, said bonding layer having a softening or melting point which is less than the melting point of the film, less than or equal to the softening point or melting point of the sealing layer, and is from 70 to 120° C. (Ring and Ball), having a viscosity of from 500 to 4000 centipoises at 160° C. (Brookfield, Spindle No.9, 5 r.p.m.), and being formed of polyethylene, ethylene/vinyl acetate copolymer, polyvinylidene chloride, polyamide or wax.

According to a further aspect of the present invention there is provided a tear tape for use in the aforementioned combination, which tear tape comprises:

(i) a film having a thickness of from 20 to 60 microns and a width of from 1 to 20mm and formed from oriented polyethylene, and (ii) a bonding layer provided on a surface of the film at a coating weight of from 20 to 100 grams per square meter, said bonding layer having a softening or melting point which is less than the melting point of the film and is from 70° C. to 120° C. (Ring and Ball), having a viscosity of from 500 to 4000 centipoises at 160° C. (Brookfield Spindle No.9, 5 r.p.m.), and being formed of ethylene/vinyl acetate copolymer or, in the case where the film is untreated and possesses a low surface tension, a pressure sensitive adhesive.

According to a still further aspect of the present invention there is provided method of forming a package for a product which comprises (i) providing a tear tape as hereinbefore defined, (ii) attaching packaging material and tear tape together to form a combination as hereinbefore defined by heat activating the bonding layer of the tear tape and bringing the bonding layer into contact with the packaging material (iii) overlapping the packaging material to form a tube including a side seal, (iv) inserting the product in the tube, and (v) closing the tube by forming end seals wherein the tear tape is sandwiched between layers of packaging material at the end seals.

BRIEF DESCRIPTION OF THE DRAWINGS

For a better understanding of the present invention and to show how the same may be carried into effect, reference will now be made, by way of example, to the accompanying drawings, in which:-

DESCRIPTION OF PREFERRED EMBODIMENTS

Figure 1:
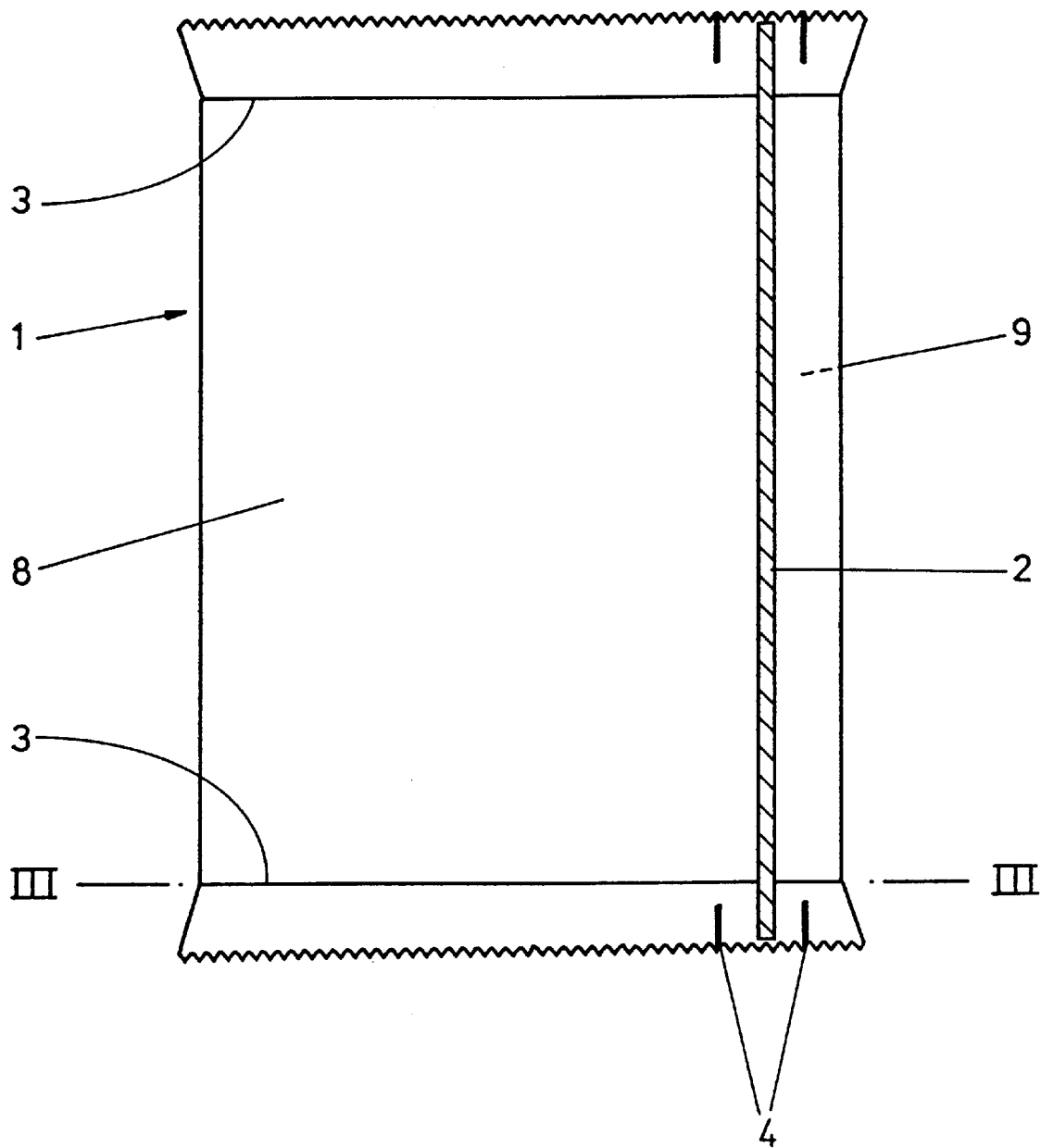
FIG. 1 is a plan view of a package formed from packaging material having a tear tape according to the present invention.

Referring to FIG. 1, there is shown a hermetically sealed package 1, formed from packaging material. The packaging material has a tear tape 2 adhered thereto prior to being wrapped around the product to be packaged by, for example, a flow wrapping or vacuum wrapping technique. Thus, for example, the packaging material, with the tear tape 2 attached thereto, is folded and sealed longitudinally by heat and pressure to form a tube enveloping the product (not shown) with the tear tape 2 extending longitudinally along the whole length of the tube. The ends of the tube are then sealed by heat and pressure to form end seals 3 (FIG. 3) comprising joined portions 8,9 of packaging material between which the tear tape 2 is sandwiched. The tear tape 2, which may be plain or printed to indicate its presence or to act as a promotional aid, is applied to the packaging material in-line as the package is formed around the product such that the surface of the tear tape including the bonding layer adheres across the full length of the package. The surface of the tear tape including the sealing layer is adhered to the package at both end seals 3 only as a consequence of the heat and pressure used to create the end seals. To facilitate easy access to the package, a pair of slits 4 may be provided at the end seals 3 to form a tab around the tear tape 2. In some cases, it may be sufficient to provide a single slit 4 located on that side of the tear tape 2 most remote from the tube edge. Instead of providing one or more slits 4, the tear tape may be positioned on or close to the edge of the package such that tear propagation from the seal serration is easy.

Figure 2:
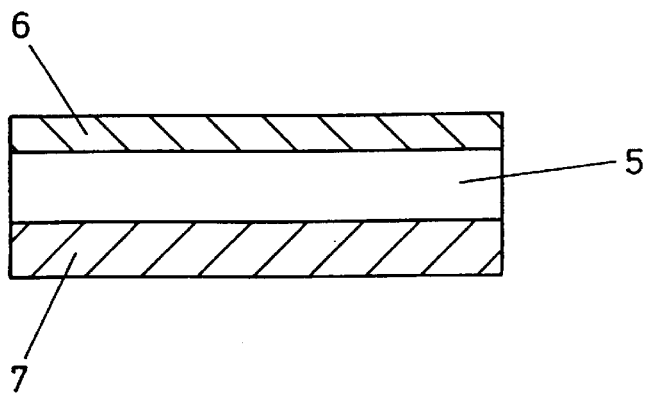
FIG. 2 is a cross sectional view of the tear tape of the package of FIG. 1 on an enlarged scale.

FIG. 2 illustrates the tear tape 2. It is flexible and strong and has a breaking strength greater than the tear resistance of the packaging material, otherwise breaking of the tear tape would occur in the opening operation. The tear tape comprises a substrate in the form of a base film 5 having, for example, a thickness of from 20 to 60 microns and a width of from 1 to 20 mm. Preferably the thickness is from 25–40 microns and the width is from 1.5 to 15 mm.

Generally, the tear tape is produced by forming a wide base film carrying the sealing layer and the bonding layer and then slitting the film to obtain tear tape of the desired width.

The base film 5 is formed from plastics material oriented so as to improve the cross tear resistance and to enable thinner tapes to be produced. Any monoaxially or biaxially orientated thermoplastics material may be used as the base film, provided that it is sufficiently dimensionally stable in the cross direction to facilitate accurate slitting of sheets of the material to form the substrate. It is particularly preferred for the thermoplastic plastics material to be formed from monoaxially orientated polypropylene, orientated polyethylene or orientated polyester.

On one surface of the base film 5, is the sealing layer 6 of plastics material to provide polymeric compatibility between the base film 5 and the inner surface 21 of the packaging material portion 8 at the end seals 3. This compatibility ensures that a good hermetic seal is maintained between the sealing layer 6 and the inner surface 21 when the end seal 3 is formed by pressure, thermal, ultrasonic or Radio Frequency welding.

Typically, the width of the sealing layer 6 is equal to the base film width and the thickness is from 10 to 20 microns. Any thermoplastics material compatible with inner surface 21 may be used to form the layer 6 provided that its softening or melting point is lower than the melting point of the base film 5. Typically, thermoplastic polymers such as polyethylene, ethylene vinyl acetate copolymer, polyvinylidene chloride, polyamides and waxes are suitable for the layer 6 and may be applied to the base film 5 by any suitable coating technique such as co-extrusion or extrusion coating. It is particularly preferred for the layer 6 to be of oriented polyethylene and to be applied to the base film 5 using coextrusion.

Applied onto the other surface of the base film 5 is bonding layer 7 of plastics material. The purpose of the layer 7 is twofold. Its prime purpose is to provide a bond between the base film 5 and the inner surface 22 of the packaging material portion 9 across the whole package length and at each end seal 3 in order to ensure efficient opening. In addition, the bonding layer also ensures that a hermetic seal is maintained around the tear tape at each end seal 3. Maintenance of a good hermetic seal around the tear tape is achieved by a portion of the bonding layer 7 flowing from its original position on the surface of the base film 5 to the edges of the base film under the pressure and temperature required for sealing the packaging material portions at the package ends. The degree of flow during the package sealing operation is governed by the softening or melting point and viscosity of the material of bonding layer 7. A softening point of from 70 to 120° C. (Ring and Ball) and a viscosity of from 500 to 4000 centipoise at 160° C. (Brookfield Viscometer, Spindle No.9, 5 r.p.m.) are preferred. It is further preferred that a plastics material possessing a softening point of from 90–115° C. and a viscosity of from 800–2000 centipoise at 160° C. is used. The flowing action of layer 7 ensures that all gaps in the end seals 3 that would otherwise cause ingress of air, moisture or bacteria, are eliminated.

The width of bonding layer 7 may be less than that of the base film 5 and may have a coating weight of from 5 to 50 grams per square meter. Preferably an overall coating is used whereby the width is equal to the base film width and the coating weight is from 15 to 35 gsm. Any thermoplastics material may be used to form this layer providing its softening or melting point is lower than the melting point of the base film 5 and equal to or lower than the softening or melting point of the material of layer 6. Typically, thermoplastic polymers such as polyethylene, ethylene vinyl acetate copolymer, polyvinylidene chloride, polyamides and waxes are suitable for this application and may be applied using any suitable coating technique such as co-extrusion, extrusion coating, coating from solution or dispersion using reverse gravure, 2 roll reverse coating or Meyer bar coating. It is particularly preferred for the layer 7 to be formed of ethylene vinyl acetate copolymer and for it to be coated onto the base film 5 using traditional hot melt coating or extrusion coating techniques.

Figure 3:
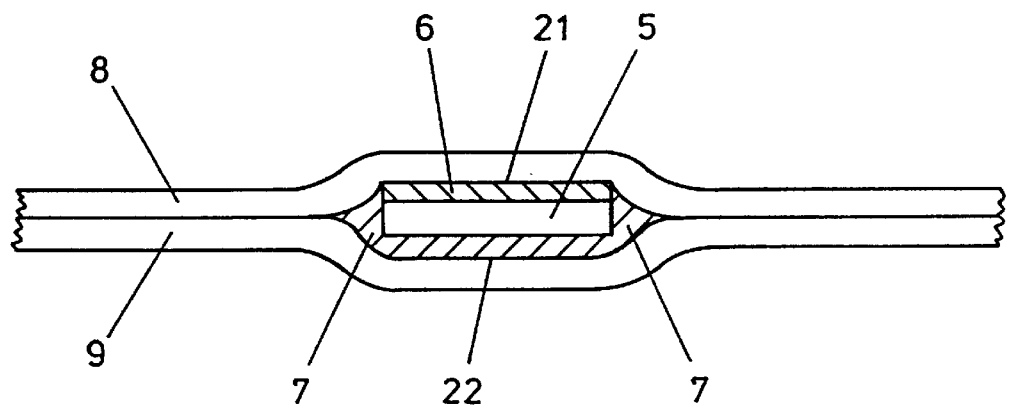
FIG. 3 is a cross sectional view through an end seal of the package of FIG. 1 along the line III—III and on an enlarged scale.

FIG. 3 illustrates a cross sectional view of the package and tear tape. The bonding layer 7 of the tear tape has previously been adhered to packaging material portion 9 and packaging material portions 8 and 9 are brought together and sealed using heat and pressure to form side and end seals in a manner typical of flow wrapping and vacuum wrapping techniques. Typical packaging materials are as described above. As can be seen from FIG. 3, the gaps normally present between a conventional tear tape and the portions 8 and 9 of the packaging material at the end seals are filled by plastics material originating from the bonding layer 7, originally on the surface of the tear tape base film, as a consequence of the conditions necessary to weld the end seals 3. A portion of material from sealing layer 6 may also transfer from its original position on the base film surface to the edges of the tear tape but it is preferred that the majority of polymer transfer originates from the material of bonding layer 7.

Figure 4:
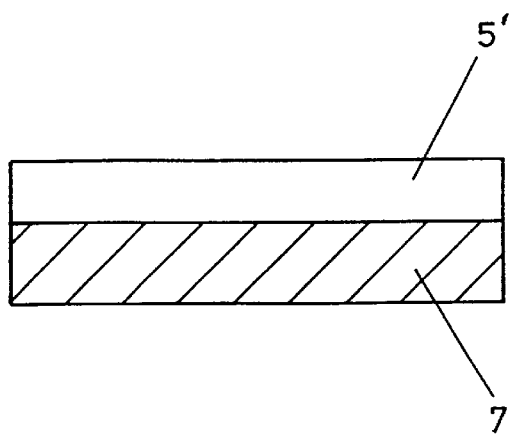
FIG. 4 is a cross-section through another embodiment of a tear tape in accordance with the present invention.

Referring now to FIG. 4, there is shown an alternative tear tape in accordance with the present invention. Parts corresponding to parts of FIGS. 1 to 3 are denoted by like reference numerals. As before the tear tape includes a substrate in the form of a base film 5' having, for example a thickness of from 20 to 60 microns and a width of 1 to 20 mm, preferably a thickness of from 25–40 microns and a width of from 1.5 to 15 mm. The plastics material of the base film 5' is orientated polyethylene. However, in this case the plastics material of the base film 5' seals to the inner surface (21) of the packaging material to facilitate a hermetic seal between the tear tape and said surface at the end seal 3 during exposure to the temperature and pressure needed to form the end seals of the package. Thus no separate sealing layer 6 is provided. The purpose of the bonding layer 7 is the same as that described above. The width of layer 7 may be less than that of the base film 5 and the layer may have a coating weight of from 20 to 100 grams per square meter. Preferably an overall coating is used whereby the width is equal to the base film width and the coating weight is from 20 to 50 gsm. Any thermoplastics material may be used to form the layer 7 provided its softening or melting point is lower than the melting point of the base film. It is preferred for the layer 7 to be of ethylene vinyl acetate copolymer coated onto the base film using traditional hot melt coating or extrusion coating techniques. Alternately in the case where the film, is untreated and possesses a low surface tension, the layer 7 may be of a pressure sensitive adhesive (cold seal, hot melt, solution, dispersion or high energy curing).

Figure 5:
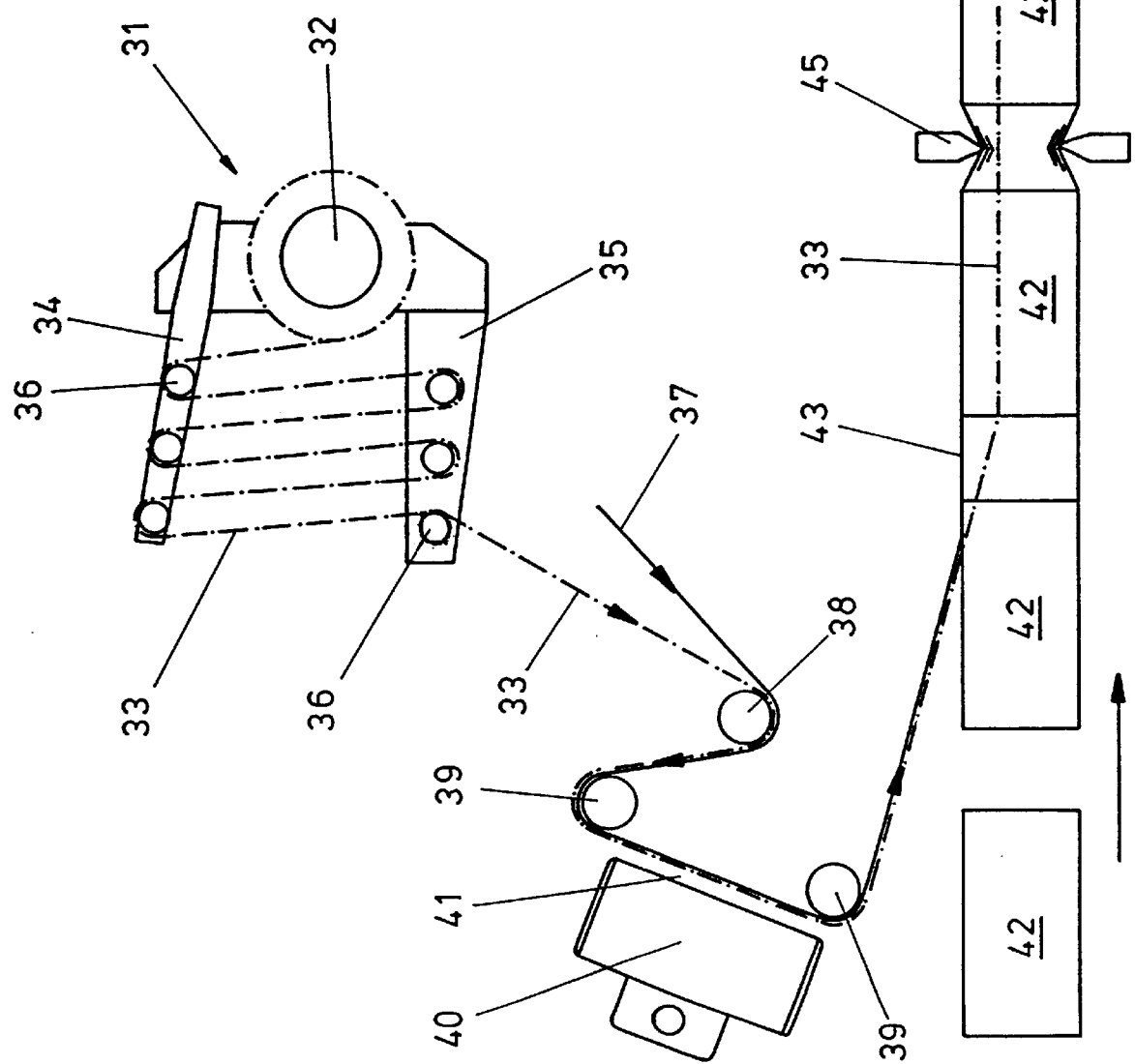
FIG. 5 is a schematic representation of one embodiment of a flow wrapping process using the packaging material and tear tape of the present invention.

Referring now to FIG. 5, this illustrates diagrammatically, the use of the packaging material and tear tape in a flow wrapping process for forming packages of products.

The Figure shows a tear tape dispenser 31 for applying the tear tape to moving filmic packaging material under controlled tension. The dispenser 31 is similar to that described in our European Patent No.0121371 and comprises motorised reel 32 carrying a continuous length of tear tape 33 in accordance with the present invention. The dispenser includes a pair of relatively moveable arms 34 and 35 carrying rollers 36 around which the tear tape passes. The relative displacement of the arms 34 and 35 is dependent on the tension in the tape (which is dependent on the tension in the packaging material) and controls the speed of rotation of the reel 32.

The tear tape 33 and the packaging material 37 are brought together around roller 38 such that the bonding layer (not shown) of the tear tape is adjacent to the packaging material and then fed around further rollers 39 so that they move past a heating means 40 in such a way that they are spaced from the heating means 40 by a gap 41. The heating means 40 may be in the form of an infra-red lamp or an electrical wire, wound and shrouded, element so as to produce radiant heat energy. Alternatively, the heating means 40 may utilise hot air transferred from a remote heat source by convection or mechanically forced heated gas or air. Preferably the heating means 40 is controlled such that, when the wrapping process is in a dwell situation, the heating effect is cut off in order to ensure that no heat damage occurs. This heat control can be effected by interfacing with a control signal from the wrapping machinery or by sensing the cessation of motion of the packaging material.

The heat from the heating means 40 activates the bonding layer of the tear tape so that the tear tape becomes adhered to the packaging material 37. Thereafter the packaging material 37, having the tear tape 33 adhered thereto is brought adjacent to a moving line of products 42 to be packaged and is overlapped and sealed longitudinally (by a means not shown) so as to form a tube 43 having a side seal (not shown) into which tube the products 42 are inserted. An end seal 44 is then produced, at either side of each product, by the application of heat and pressure using sealing and cutting jaws 45. Each end seal includes tear tape 33 sandwiched between portions of packaging material 37 yet the resultant package remains air tight as previously described.

Figure 6:
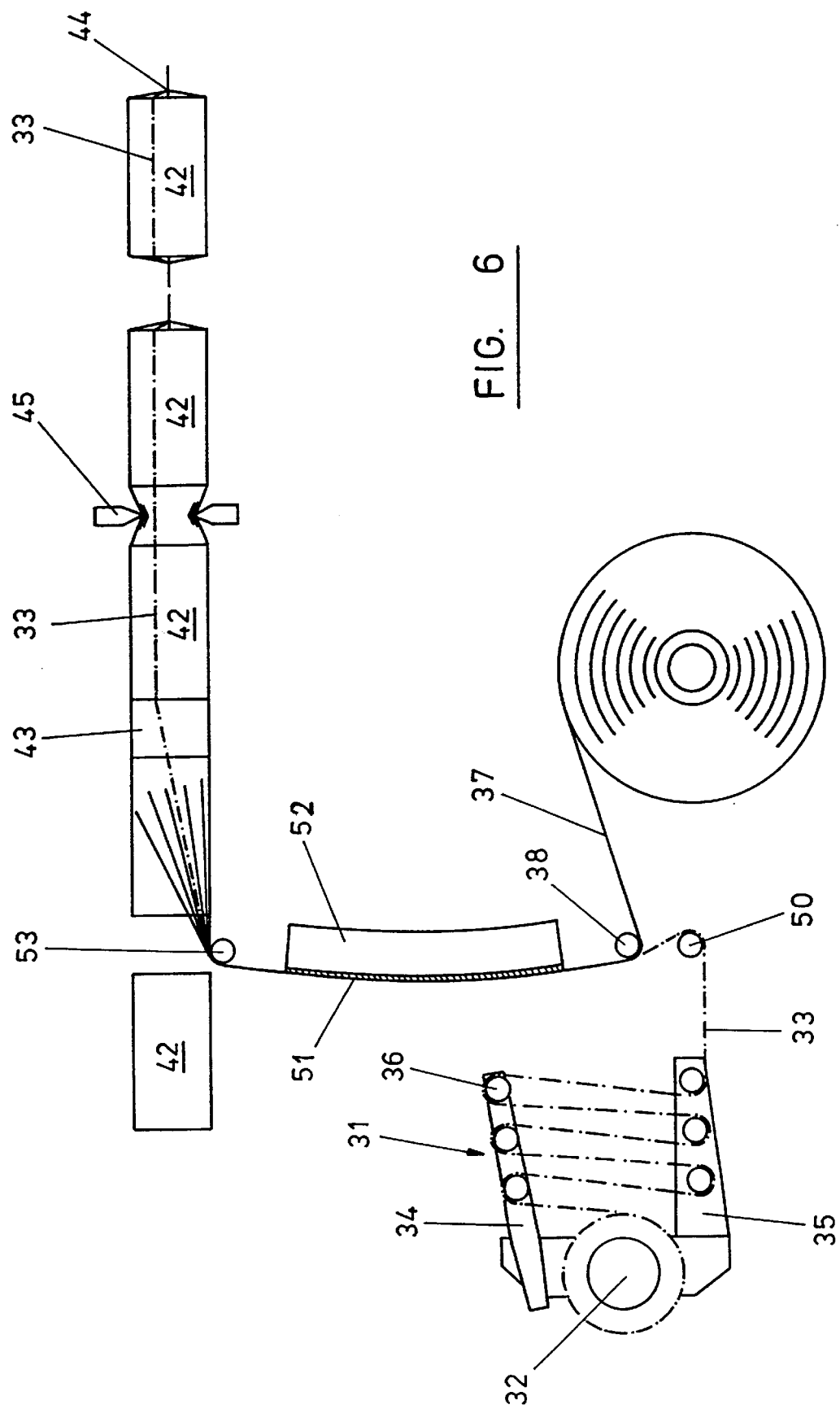
FIG. 6 is a schematic representation of another embodiment of a flow wrapping process using the packaging material and tear tape of the present invention.
Figure 7:
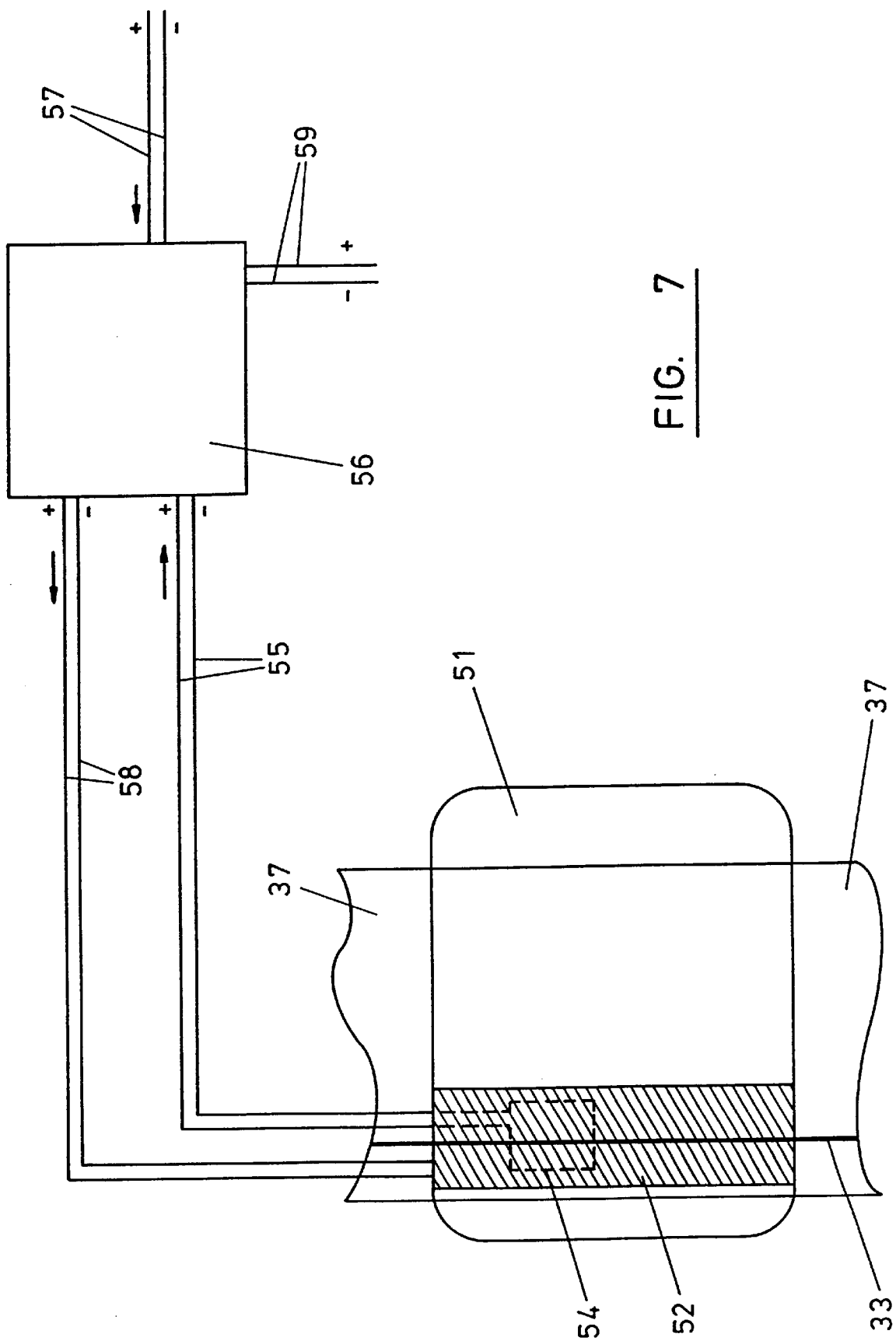
FIG. 7 is a schematic representation of a part of the embodiment of FIG. 6.

Referring now to FIGS. 6 & 7, parts corresponding to parts of FIG. 5 are denoted by like reference numerals.

In this case, the bonding layer of the tear tape 33 is activated by contacting the tear tape with a heated plate. The plate comprises a stainless steel sheet 51 of thickness 1.2 mm to which is bonded a proprietary silicon rubber coated etched film heater mat 52. The tear tape 33 leaving the dispenser 31 passes around an adjustable guide roller 50 and is brought into contact with packaging material 37 at roller 38 so that the bonding layer (not shown) of the tear tape is adjacent packaging material 37. Thereafter the packing material 37 and tear tape 33 are transported over the free surface of the heated plate. The free surface of the heated plate has a convex camber (with respect to the path of packaging material 37) so that the bonding layer of the tear tape 33 is urged against the packaging material 37 adjacent thereto during its passage over the heated plate. The bonding layer of the tear tape melts as the tear tape and packaging material pass over the heater mat 52 so that the tear tape and packaging material become bonded together. The heater mat 52 is located under the steel sheet 51 at a location which allows maximum heat transfer at the zone where the tear tape 33 is to be bonded to the packaging material 37. The heat, from the heater mat 52, is efficiently dissipated, by the steel sheet 51, to the remaining surface of the heated plate so that the packaging material does not become distorted as a consequence of unnecessary heat influence. Sandwiched between the heater mat 52 and steel sheet 51 is a proprietary temperature sensing thermocouple 54 operably connected, by connections 55, to a self-tuning logic temperature controller 56 which, in turn, is connected to a mains supply of electricity by connections 57. The heater pad 52 is heated electrically via connections 58 from the temperature controller 56 in accordance with a logic input received from the wrapping machine via connections 59.

The temperature of the heater mat 52 is controlled to a set point by controller 56 and alarm set points are provided so that the heater plate temperature is maintained below the melting point of the packaging material. The temperature of the heater mat 52 is ramped proportionally to the speed of movement of the packaging material 37. When the packaging material travels at higher speeds, upper set points are accessed to increase the temperature of the mat 52 to transmit more heat energy to the tear tape 33 and packaging material 37.

As will be apparent from the foregoing, the heater plate supports the full width of the packaging material 37 so that it retains its integrity and is not distorted by heat. Also, by applying the heat in a zone extending over a part only of the width of the packaging material 37, greater accuracy of heat control is obtained.

After the tear tape 33 and packaging material 37 have been bonded together, the combination passes over roller 53 and is brought adjacent to the moving line of products 42 to produce packages of the same in a manner similar to that described with reference to FIG. 5.

The following Examples illustrate the invention

EXAMPLE 1

A film of monoaxially oriented polypropylene having a melting point of 176° C. and a thickness of about 35 microns was formed in a conventional manner and coextruded with a 10–15 micron thick layer of polyethylene possessing a melting point of 115° C. In this way, there was obtained a structure comprising a polypropylene surface and a sealing layer constituted by the polyethylene. The polypropylene surface of this structure was then printed with an opening instruction using a rotogravure printing process. The printed surface was then extrusion coated with a synthetic hot melt adhesive based on ethylene vinyl acetate copolymer at a coating weight of 25 grams per square meter to form a bonding layer on the structure. The bonding layer possessed a softening point of 97° C. (Ring and Ball) and a viscosity of 1,100 centipoise at 160° C. (Brookfield Viscometer, Spindle No.9, 5 r.p.m.).

The structure was then slit longitudinally in the direction of the polypropylene orientation so as to provide a plurality of tear tapes of 4 mm wide having a sealing layer at one surface and a bonding layer at the opposite surface. The tapes were then traverse wound onto centres of internal diameter 152 mm and width 178 mm to provide reels carrying continuous lengths of tape of about 25,000 meters long.

The tear tape was subsequently applied to an untreated polyethylene packaging film in a flow wrapping machine to produce a plurality of hermetically sealed packages, each containing a food product and including a tear tape through the entire package length including the end seals. The action of the temperature and pressure on the tear tape during the formation of the end seals caused a portion of the hot melt adhesive of the bonding layer to flow from its original position on one surface of the tear tape to the tear tape edges. This eliminated gaps in the seal and hence the ingress of air, moisture and bacteria. Additionally, the polyethylene sealing surface of the tear tape became bonded to the packaging material at the end seals to maintain the integrity of the seal. Shelf life of the food product was maintained.

Although the tear tape of the invention is particularly suitable for opening hermetically sealed packs of foodstuffs such as cheese, bacon and cold meats, whilst allowing pack freshness to be maintained, it may also be used for opening the filmic packaging material conventionally provided around other products such as packets and cartons of cigarettes. In the case where the tear tape is used for cigarettes, it will generally be of a width of from 4 to 6 mm in order to facilitate printing the tape for, for example, promotional purposes.

EXAMPLE 2

The tear tape of Example 1 was applied to packaging material formed by laminating together a 20μ thick polyamide film and a 50μ thick polyethylene film. The combination was then used to form packages each containing 330 g of cheese in accordance with FIGS. 6 and 7 using a Haysenn Flow wrapping machine operating at 60 packages per minute. The end seals 44 of the packages were achieved by applying a temperature of from 110 to 120° C. using a 10 mm flat sealing and cutting jaw at a pressure of 4–5 bars and a dwell time of 3–4 seconds. Before each cheese product was inserted into the tube 43, the tube was flushed with carbon dioxide. The cheese packages were stored for 4 days in a freezer to allow the packaging material to tighten around the cheese as a consequence of the carbon dioxide being absorbed into the cheese surface. Thereafter the packages were immersed in water in a standard pressure vessel connected to a vacuum generator to simulate an internal pressure. The vacuum was held for 2 minutes and the packages were monitored for bubble formation which is indicative of a poor seal. Also the seals were examined by inspecting a section using a scanning electron microscope (800× magnification). The tests were carried out at a vacuum of 0.6 bar and at a vacuum of 1.1 bar. Also, the tests were repeated using conventional 4mm hot melt polypropylene tear tape for comparison. The results are shown in the following Table 1:

TABLE 1

|  | Example 1 Tape | Conventional PP Tape |
| --- | --- | --- |
| Seal Integrity-0.6 bar vacuum | 0% Leaks | 0% Leaks |
| Seal Integrity-1.1 bar vacuum | 0% Leaks | 10% Leaks |
| Seal Examination | Tape incorporated into seal. No identifiable gaps | Tape incorporated into seal. Gap seen across tape width at top surface of 5µ. |

EXAMPLE 3

The tear tape of Example 1 was applied to packaging material in the form of a 65µ PET/PE film. The combination was then used to form packages each consisting of 8 rashers of back bacon in accordance with FIGS. 6 and 7 using a Multi-Vac M860 Vacuum Sealing Line incorporating primary vacuum only and operating at 8 cycles per minute. The end seals were achieved at 120° C. and 1000 mbar vacuum was used. The integrity of the seals was examined in the manner described in Example 2 but using different immersion periods. Packages which would leak when subjected to this test would allow ingress of air. The experiment was repeated using a tear tape similar to that of Example 1 but of width 2mm only and also using conventional hot melt polypropylene tear tape of widths 2 mm and 4 mm. The results are shown in following Table 2.

TABLE 2

|  | Example 1 Tape | Conventional PP Tape |
| --- | --- | --- |
| Day 0-1.1 bar Vacuum | 0% Leaks | 5% Leaks |
| Day 1-1.1 bar Vacuum | 0% Leaks | 10% Leaks |
| Day 15-1.1 bar Vacuum | 0% Leaks | 100% Leaks |
| Day 56 (Expiry date for contents) | 0% Leaks | 100% Leaks |

At the end of the term the package incorporating the tape of Example 1 still contained meat that appeared satisfactory whereas the packages incorporating the conventional tape had lost all vacuum and the contents had deteriorated in quality.

Both 2 mm and 4 mm tapes behaved in a similar manner.

What is claimed is:

1. A hermetically sealed package comprising two packaging material portions in juxtaposition, and a tear tape between said material portions and extending substantially from one of the ends of one of said material portions to the other end of said one material portion, said tear tape including at least two layers, one of said layers being bonded to the adjacent one of said material portions substantially from one of the ends of said one material portion substantially to the other end of said one material portion, said two material portions being heat sealed near the ends thereof, a part of one of said layers being disposed on the side of the other of said layers in the regions where said material portions are heat sealed, whereby said package is hermetically sealed.

2. A hermetically sealed package comprising two packaging material portions in juxtaposition, and a tear tape between said material portions and extended substantially from one of the ends of one of said material portions to the other end of said one material portion, said tear tape including a base film and first and second layers on opposite sides thereof, said first layer being bonded to the adjacent one of said material portions substantially from one of the ends of said one material portion substantially to the other end of said one material portion, said two material portions being heat sealed near the ends thereof, a part of one of said layers being disposed on the side of the other of said layers and said base film in the regions where said material portions are heat sealed, whereby said package is hermetically sealed.

3. The package of claim 2, wherein said one of said layers is hot melt adhesive.

4. The package of claim 2, wherein said one of said layers is ethylene vinyl acetate copolymer.

5. The package of claim 2, wherein said base film has a thickness from 20 to 60 microns and a width of from 1 to 20 mm and formed of oriented polypropylene or oriented polyester, said one of said layers having a thickness of 5 to 40 microns and a melting point which is less than the melting point of said base film, said other of said layers having a weight from 5 to 50 grams per square meter and having a melting point which is less than the melting point of said base film and less than or equal to the melting point of said one of said layers.

6. The package of claim 2, wherein each of said packaging material portions is an LDPE/PVDC/LDPE multi-layer material or a PVDC coated PET/LDPE material or a metallised PET/LDPE material or a cast polyamide/LDPE material.

7. The package of claim 2, wherein said one of said layers is polyethylene or ethylene/vinyl acetate copolymer or polyvinylidene chloride or polyamide or wax and the other of said layers is formed of ethylene vinyl acetate copolymer and has a viscosity of from 500 to 4000 centipoises at 160° C. (Brookfield, Spindle No. 9, 5 r.p.m.), or is a pressure sensitive adhesive.

8. A method of forming a hermetically sealed package comprising providing two packaging material portions, providing a tear tape extending substantially from one of the ends of one of said material portions to the other end of said one material portion and including at least two layers, placing said tear tape on one of said packaging material portions, whereby one of said layers is in contact with said one material portion substantially from said one end to said other end, heat activating said one layer to bond said tear tape to said one material portion, juxtaposing said packaging material portions, heat sealing said material portions near their ends to enclose a product therebetween, and to cause a part of one of said layers to be disposed on the side of the other of said layers in the regions where the ends of said packaging material portions are heat sealed, thereby hermetically sealing said package, wherein one of said layers flows and fills any gap between said packaging material portions in the region of the tear tape.

9. A method of forming a hermetically sealed package comprising providing two packaging material portions, providing a tear tape extending substantially from one of the ends of one of said material portions to the other end of said one material portion and including a base film and first and second layers on opposite sides thereof, placing said tear tape on one of said packaging material portions, whereby one of said layers is in contact with said one material portion substantially from said one end to said other end, heat activating said one layer to bond said tear tape to said one material portion, juxtaposing said packaging material portions, heat sealing said material portions near their side to enclose a product therebetween and to cause a part of one of said layers to be disposed on the side of the other said layers in the regions where the ends of said packaging material portions are heat sealed, thereby hermetically sealing said package, wherein one of said layers flows and fills any gap between said packaging material portions in the region of the tear tape.

* * * * *

UNITED STATES PATENT AND TRADEMARK OFFICE
CERTIFICATE OF CORRECTION

Page 1 of 1

PATENT NO. : 6,228,458 B1
DATED : May 8, 2001
INVENTOR(S) : Pinchen et al.

It is certified that error appears in the above-identified patent and that said Letters Patent is hereby corrected as shown below:

<u>Column 12,</u>
Line 4, "side" should be -- ends --.

Signed and Sealed this

Nineteenth Day of March, 2002

Attest:

JAMES E. ROGAN
Attesting Officer
Director of the United States Patent and Trademark Office